United States Patent
Stewart et al.

(10) Patent No.: US 8,954,268 B1
(45) Date of Patent: Feb. 10, 2015

(54) USING LOCATION-BASED LOGIC TO ADJUST BUILDING AUTOMATION SCHEDULES

(71) Applicant: Lenovo (Singapore) Pte., Ltd., New Tech Park (SG)

(72) Inventors: Aaron Michael Stewart, Raleigh, NC (US); Michaela Rose Case, Raleigh, NC (US); Howard Locker, Cary, NC (US); John Weldon Nicholson, Cary, NC (US)

(73) Assignee: Lenovo (Singapore) Pte. Ltd., Tech Park (SG)

( * ) Notice: Subject to any disclaimer, the term of this patent is extended or adjusted under 35 U.S.C. 154(b) by 0 days.

(21) Appl. No.: 14/144,126

(22) Filed: Dec. 30, 2013

(51) Int. Cl.
*G01C 21/20* (2006.01)
(52) U.S. Cl.
CPC .................... *G01C 21/206* (2013.01)
USPC .......................................................... 701/465
(58) Field of Classification Search
USPC .......................................................... 701/465
See application file for complete search history.

(56) References Cited

U.S. PATENT DOCUMENTS

| | | | |
|---|---|---|---|
| 7,283,970 B2 * | 10/2007 | Cragun et al. | 705/7.19 |
| 8,090,477 B1 * | 1/2012 | Steinberg | 700/278 |
| 2009/0210351 A1 * | 8/2009 | Bush et al. | 705/80 |
| 2013/0173064 A1 * | 7/2013 | Fadell et al. | 700/276 |
| 2014/0052300 A1 * | 2/2014 | Matsuoka et al. | 700/276 |

* cited by examiner

*Primary Examiner* — Thomas Tarcza
*Assistant Examiner* — Alex C Dunn
(74) *Attorney, Agent, or Firm* — Kunzler Law Group (57) ABSTRACT

An apparatus for adjusting scheduled events in an automation system of a building at a predetermined location includes a location module, an arrival time module, and a regulator module. The location module determines a current location of a user in response to a triggering event. The arrival time module calculates an estimated time of arrival of the user at a residence. The regulator module adjusts a characteristic of a scheduled event in the automation system in response to comparing the estimated time of arrival of the user to a time of the scheduled event in the automation system.

20 Claims, 5 Drawing Sheets

USING LOCATION-BASED LOGIC TO ADJUST BUILDING AUTOMATION SCHEDULES

FIELD

The subject matter disclosed herein relates to adjusting scheduled events in an automation system and more particularly relates to using location-based services to adjust scheduled events in an automation system.

BACKGROUND

Description of the Related Art

Building automation systems, such as security systems or heating, ventilation, and air-condition ("HVAC") systems, allow a user to automate changes to the environmental conditions of a building. A user may set a schedule of changes to one or more environmental conditions of a building, and this schedule is often related to a user's daily schedule and whether or not the user is at the building. For example, a user may schedule for an HVAC system to cool a home before the user gets home from work. Or a user may schedule for an oven to preheat before the user arrives home. Thus, building automation systems save users time and provide users convenience. Sometimes, preset schedules in building automation systems may not match a user's schedule, creating inefficiencies or inconveniences. For example, if a user is late arriving at home, a preset temperature schedule may result in cooling or heating an empty residence for a prolonged period of time. Alternatively, if a user arrives at home early, a preset temperature schedule may result in the residence being too hot or cold.

BRIEF SUMMARY

An apparatus for adjusting scheduled events in an automation system of a residence is disclosed. A method and computer program product also perform the functions of the apparatus.

An apparatus for adjusting scheduled events in an automation system of a building at a predetermined location includes a location module, an arrival time module, and a regulator module. In one embodiment, the apparatus also includes a memory module. The location module determines a current location of a user in response to a triggering event. In one embodiment, the location module determining a current location of the user in response to a triggering event includes querying a location-based service in communication with a mobile device of the user or a vehicle of the user. In some embodiments, a triggering event is selected from a group consisting of a command from the user and an arrival of a preset time.

The arrival time module calculates an estimated time of arrival of the user at a residence. In certain embodiments, the arrival time module calculating an estimated time of arrival of the user at the predetermined location includes factoring in the distance between the current location of the user and the predetermined location, a schedule of the user, a mode of transportation of the user, current traffic conditions, current weather conditions, and/or a commuting history of the user.

The regulator module adjusts a characteristic of scheduled event in the automation system in response to comparing the estimated time of arrival of the user to a time of the scheduled event in the automation system. In one embodiment, the regulator module adjusting a characteristic of a scheduled event in the automation system in response to comparing the estimated time of arrival of the user to a time of the scheduled event in the automation system includes receiving permission from the user to adjust the characteristic of a scheduled event in the automation system and/or receiving from the user an adjustment of the characteristic of a scheduled event in the automation system. In another embodiment, the characteristic of a scheduled event in the automation system is selected from a group consisting of a time of the scheduled event, a duration of the scheduled event, and an intensity of the scheduled event. In certain embodiments, the memory module records one or more adjustments of the characteristic of the scheduled event in the automation system and an actual time of arrival of the user corresponding to the one or more adjustments of the characteristic of scheduled event in the automation system.

A method for adjusting scheduled events in an automation system includes determining a current location of a user in response to a triggering event, calculating an estimated time of arrival of the user at a predetermined location, and adjusting a characteristic of a scheduled event in the automation system in response to comparing the estimated time of arrival of the user to a time of the scheduled event in the automation system. In one embodiment, the method also includes recording one or more adjustments of the characteristic of the scheduled event in the automation system and an actual time of arrival of the user corresponding to the one or more adjustments of the characteristic of the scheduled event in the automation system. In another embodiment, determining a current location of the user in response to a triggering event includes querying a location-based service in communication with a mobile device of the user and/or a vehicle of the user. In some embodiments, a triggering event is selected from a group consisting of a command from the user and an arrival of a preset time.

In certain embodiments, calculating an estimated time of arrival of the user at a residence includes factoring in one or more of the distance between the current location of the user and the predetermined location, a schedule of the user, a mode of transportation of the user, current traffic conditions, current weather conditions, and a commuting history of the user. In an embodiment, adjusting a characteristic of a scheduled event in the automation system in response to comparing the estimated time of arrival of the user to a time of the scheduled event in the automation system includes receiving permission from the user to adjust the characteristic of the scheduled event in the automation system and/or receiving from the user an adjustment of the characteristic of the scheduled event in the automation system. In another embodiment, the characteristic of a scheduled event in the automation system is selected from a group consisting of a time of the scheduled event, a duration of the scheduled event, and an intensity of the scheduled event.

A computer program product includes a computer readable storage medium storing machine readable code executable by a process to determine a current location of a user in response to a triggering event, calculate an estimated time of arrival of the user at a predetermined location, and adjust a characteristic of a scheduled event in the automation system in response to comparing the estimated time of arrival of the user to a time of the scheduled event in the automation system. In one embodiment, determining a current location of the user in response to a triggering event includes querying a location-based service in communication with a mobile device of the user and/or a vehicle of the user. In some embodiments, a triggering event is selected from a group consisting of a command from the user and an arrival of a preset time.

In certain embodiments, calculating an estimated time of arrival of the user at a predetermined location includes factoring in the distance between the current location of the user and the residence, a schedule of the user, a mode of transportation of the user, current traffic conditions, current weather conditions, and/or a commuting history of the user. In an embodiment, adjusting a characteristic of a scheduled event in the automation system in response to comparing the estimated time of arrival of the user to a time of the scheduled event in the automation system includes receiving permission from the user to adjust the characteristic of the scheduled event in the automation system and/or receiving from the user an adjustment of the characteristic of the scheduled event in the automation system. In another embodiment, the characteristic of a scheduled events in the automation system is selected from a group consisting of a time of the scheduled event, a duration of the scheduled event, and an intensity of the scheduled event.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine readable code and/or software for execution by various types of processors. An identified module of machine readable code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of machine readable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices, and may exist, at least partially, merely as electronic signals on a system or network. Where a module or portions of a module are implemented in software, the software portions are stored on one or more computer readable storage devices.

Any combination of one or more computer readable medium may be utilized. The computer readable medium may be a machine readable signal medium or a storage device. The computer readable medium may be a storage device storing the machine readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A machine readable signal medium may include a propagated data signal with machine readable code embodied therein, for example, in baseband or as part of a carrier wave. Such a propagated signal may take any of a variety of forms, including, but not limited to, electro-magnetic, optical, or any suitable combination thereof. A machine readable signal medium may be any storage device that is not a computer readable storage medium and that can communicate, propagate, or transport a program for use by or in connection with an instruction execution system, apparatus, or device. Machine readable code embodied on a storage device may be transmitted using any appropriate medium, including but not limited to wireless, wireline, optical fiber cable, Radio Frequency (RF), etc., or any suitable combination of the foregoing.

Machine readable code for carrying out operations for embodiments may be written in any combination of one or more programming languages, including an object oriented programming language such as Java, Smalltalk, C++ or the like and conventional procedural programming languages, such as the "C" programming language or similar programming languages. The machine readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by machine readable code. These machine readable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The machine readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The machine readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and machine readable code.

Descriptions of Figures may refer to elements described in previous Figures, like numbers referring to like elements.

Figure 1:
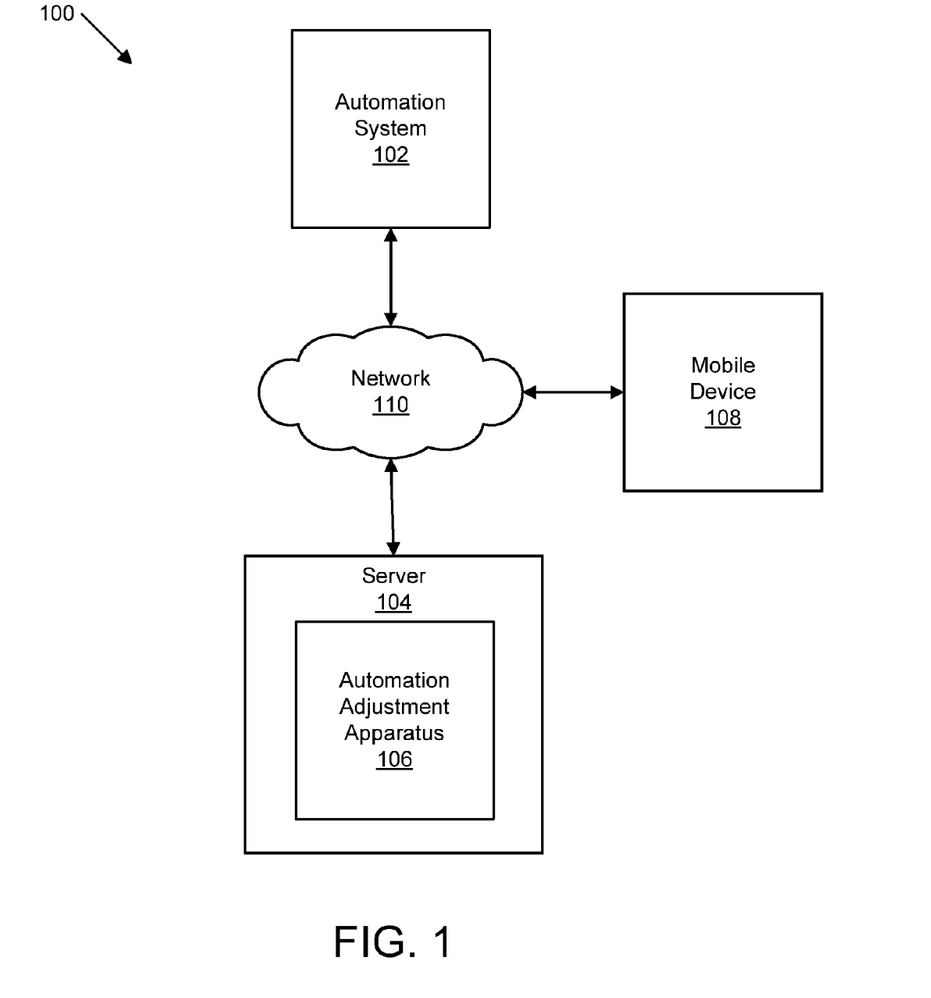
FIG. 1 is a schematic block diagram illustrating one embodiment of a system for adjusting scheduled events in an automation system.

FIG. 1 is a schematic block diagram illustrating one embodiment of a system for adjusting scheduled events in an automation system. The system 100 includes an automation system 102 connected to (i) a server 104 having an automation adjustment apparatus 106 and (ii) a mobile device 108 of a user through a network 110, which are described below.

The system 100 includes a building automation system 102 that controls one or more features or environmental conditions pertaining to a building. In one embodiment, the building may be a residence, such as a private home, dormitory, or a hotel suite. In another embodiment, the building may be a commercial office, store, school, or other predetermined location. An automation system 102 may include one or more of separate systems for controlling one or more features or environmental conditions pertaining to the building. In one instance, an automation system 102 may be a home security system. In another instance, an automation system 102 may be a heating, ventilation, and air conditioning ("HVAC") system. In other instances, an automation system 102 may control other electronic equipment or systems pertaining to a building, including but not limited to, locks, lighting, sprinklers, entertainment systems, fireplaces, and appliances. The automation system 102 communicates via a network 110 with a mobile device 108 and a server 104 having an automation adjustment apparatus 106. The mobile device 108 may be a smartphone, a tablet computer, a laptop computer, another handheld/wearable electronic device, or an automobile. In one embodiment, the automation adjustment apparatus 106 may reside within the automation system 102. The automation adjustment apparatus 106, in another embodiment, may reside partially on the server 104 and partially on within the automation system 102. The automation adjustment apparatus 106 is described in more detail with respect to the apparatus 200 in FIG. 2. The network 110 connecting the automation system 102, the server 104, and the mobile device of a user 108 may include a local area network ("LAN"), a wide area network ("WAN"), a wireless network, a cellular network, the Internet, or the like.

Figure 2:
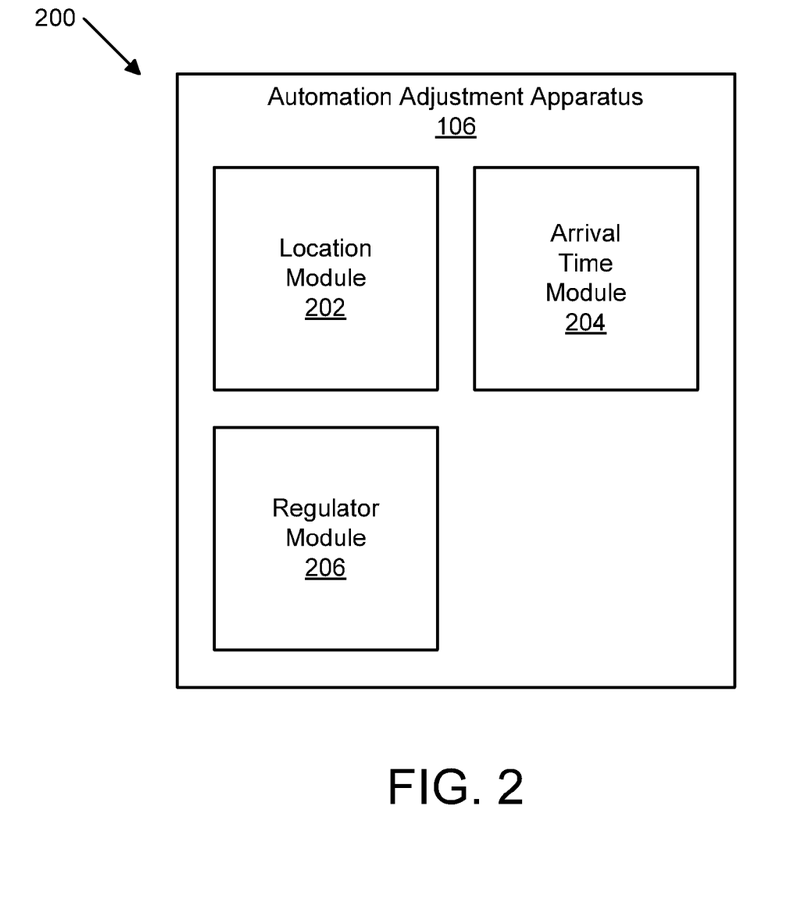
FIG. 2 is a schematic block diagram illustrating one embodiment of an apparatus for adjusting scheduled events in an automation system.

FIG. 2 is a schematic block diagram illustrating one embodiment of an apparatus 200 for adjusting scheduled events in an automation system. The apparatus 200 includes one embodiment of an automation adjustment apparatus 106 with a location module 202, an arrival time module 204, and a regulator module 206, which are described below.

The location module 202 determines a current location of a user at a predetermined location in response to a triggering event. Typically, the user is an occupant who lives in or individual who works in the building at the predetermined location controlled by the automation system 102. In addition, a user may be an individual recognized by the automation system 102 as a visitor of the building, such as a houseguest, vacationer, housekeeper, gardener, contractor, or the like. Users may also be classified by priority. A triggering event may be a command from a user to adjust a setting of the automation system 102. A triggering event can also be an arrival of a preset time. A preset time may be a set time of day or week, such as 6 p.m. daily or 5 p.m. every Tuesday. A preset time may also be a time relative to a known event, such as 5 minutes after sunset, 15 minutes before the start of a particular television show, or an hour before a scheduled dinner party.

In one embodiment, the location module 202 determines a current location of a user by querying a location-based service in communication with a mobile device 108 of the user. The location-based service provides a current location of the mobile device 108 as the current location of the user to the location module 202. Using the current location of the mobile device 108 leverages the ubiquity of one or more mobile devices 108 carried by users and the physical proximity of a mobile device 108 to the user to determine the current location of the user. In another embodiment, the location module 202 determines a current location of a user by querying a location-based service in communication with a vehicle of the user. In this embodiment, the location-based service provides a current location of the vehicle as the current location of the user to the location module 202.

The arrival time module 204 calculates an estimated time of arrival ("ETA") of the user at the building at the predetermined location. The arrival time module 204 may take into account several factors when calculating an estimated time of arrival of the user at the predetermined location. In one embodiment, the arrival time module 204 takes into account the current location of the user and determines an ETA of the user based on the distance between the current location of the user and the predetermined location. In another embodiment, the arrival time module 204 takes into account a schedule of the user to determine an ETA of the user. For example, the arrival time module 204 may review a user's electronic calendar to determine if the user has an appointment at a location beside the predetermined location (e.g., doctor's office, school, work function) and factor in the blocked out appointment time into the ETA of the user at the predetermined location. The arrival time module 204, in still another embodiment, factors in the mode of transportation of the user when calculating an ETA of the user. A mode of transportation may be a private automobile (e.g., car, truck, motorcycle, taxi), public transportation (e.g., bus, subway, light rail), or other means (e.g., bicycle, walking). As an example, the arrival time module 204 may recognize that a user is taking a bus and factor into an ETA the preset bus schedule and the walking distance between the predetermined location and the nearest bus stop. In yet another embodiment, the arrival time module 204 takes into account current traffic conditions between the current location of the user and the predetermined location to determine the ETA. For example, the arrival time module 204 may factor in delays caused by traffic accidents, road closures, and/or general traffic congestion when calculating an ETA for the user. In some embodiments, the arrival time module 204 takes into account current weather conditions near the current location of the user and/or the predetermined location in calculating an ETA of the user. For example the arrival time module 204 may factor in delays caused by inclement weather (e.g., rain, snow, hail, sleet) when calculating an ETA.

In certain embodiments, the arrival time module 204 factors in a commuting history of the user when determining an ETA for the user. The commuting history of a user comprises routes traveled by a user between the predetermined location and other recognized locations (e.g., school, office, gym, doctor), past appointments for the user at a location other than the predetermined location, unscheduled stops for the user in the past, and actual times of arrival at the predetermined location for the user in the past. As an example, the arrival time module 204 may recognize that a user usually stops at the grocery store on the way home from work every Wednesday and that his or her actual time of arrival on Wednesdays is generally 15 minutes after the occurrence of a scheduled event in an automation system. Thus, the arrival time module 204 will factor in this pattern from the commuting history of the user into its calculation of an ETA for the user. The arrival time module 204, in one embodiment, will recalculate an ETA of the user periodically after an initial calculation of an ETA for the user. For example, the arrival time module 204 may recalculate an ETA for a user until an adjustment to a scheduled event in an automation system is made, or until the user confirms or rejects a proposed adjustment to a scheduled event in an automation system.

The regulator module 206 adjusts a characteristic of a scheduled event in the automation system in response to comparing the estimated time of arrival of the user to a time of the scheduled event in the automation system. Typically, the regulator module 206 compares the ETA of a user with a time of a scheduled event that will occur between the current time and the ETA of the user at the predetermined location. Limiting the comparison to the time of scheduled events between the current time and the ETA of the user helps limit unnecessary comparisons and adjustments to later scheduled events in an automation system. In addition, the regulator module 206 could compare the ETA of a user with a time of a scheduled event that will occur between the current time and a set time period after the ETA of the user at the predetermined location. For example, the regulator module 206 may compare an ETA of the user with the times of all scheduled events in an automation system that occur between the current time and 30 minutes after the ETA of the user. This extended time comparison period accounts for a margin of error in the ETA so that scheduled events occurring immediately after the ETA can be adjusted if necessary. In some embodiments, the regulator module 206 also compares the ETA of a user with the current time. If the ETA of a user matches the current time, this indicates that the user is already at the predetermined location and that no adjustments should be made to scheduled events in an automation system.

In one embodiment, the regulator module 206 adjusts a characteristic of one or more scheduled events in the automation system that will occur later than an ETA of the user. In another embodiment, the regulator module 206 adjusts a characteristic of one or more scheduled events in the automation system that will occur earlier than an ETA of the user. A characteristic of a scheduled event that a regulator module 206 may adjust includes a time of the scheduled event, a duration of the scheduled event, or an intensity of the scheduled event. For example, the regulator module 206 may delay the preheating of an oven in response to determining that the ETA of the user will occur later than the originally scheduled time for preheating the oven. Alternatively, the regulator module 206 may start preheating an oven earlier in response to determining that the ETA of the user will occur earlier than the originally scheduled time for preheating the oven. In addition to starting the preheating of the oven earlier, the regulator module 206 may also shorten the preheating time and/or increase the preheating temperature of the oven.

In certain embodiments, the regulator module 206 makes a one-time adjustment in one or more scheduled events in an automation system of the predetermined location. In other embodiments, the regulator module 206 makes a permanent adjustment in one or more scheduled events in an automation system of the predetermined location. In some embodiments, adjusting a characteristic of one or more scheduled events in an automation system includes proposing an adjustment to the user and receiving permission from the user to make the adjustment. In these embodiments, the regulator module 206 adjusts a characteristic of one or more scheduled events only when it receives permission from the user to do so. In still other embodiments, adjusting a characteristic of one or more scheduled events in an automation system includes prompting the user to specify an adjustment of a scheduled event and receiving the specific adjustment from the user. For example, the regulator module 206 may prompt the user to adjust (i) the scheduled time for turning on lawn sprinklers and/or (ii) the duration of the operation of the sprinklers.

In yet another embodiment, adjusting a characteristic of one or more scheduled events in an automation system includes factoring in a schedule adjustment history of the user. A schedule adjustment history of a user includes past adjustments to one or more scheduled events in an automation system by a user for a certain period of time. In this embodiment, the regulator module 206 attempts to recognize patterns in the schedule adjustment history of the user and apply the pattern to propose an adjustment to a characteristic of a scheduled event. For example, the regulator module 206 may recognize that a user often declines to adjust one or more scheduled events (e.g., turn on/off interior lights), and thus decide not to adjust a scheduled event.

In some instances, the apparatus 200 accommodates multiple simultaneous users. In these instances, the location module 202 determines the current location of each user in response to a triggering event as described above. In addition, the arrival time module 204 determines the ETA of each user at a predetermined location as described above. Furthermore, the regulator module 206 selects the ETA of a single user to compare with a time of one or more scheduled events in an automation system of the predetermined location. In embodiments where a user has a priority rating, the regulator module selects the ETA of the user with the highest priority rating. In other embodiments, the regulator module selects the ETA of the user having the earliest ETA.

Figure 3:
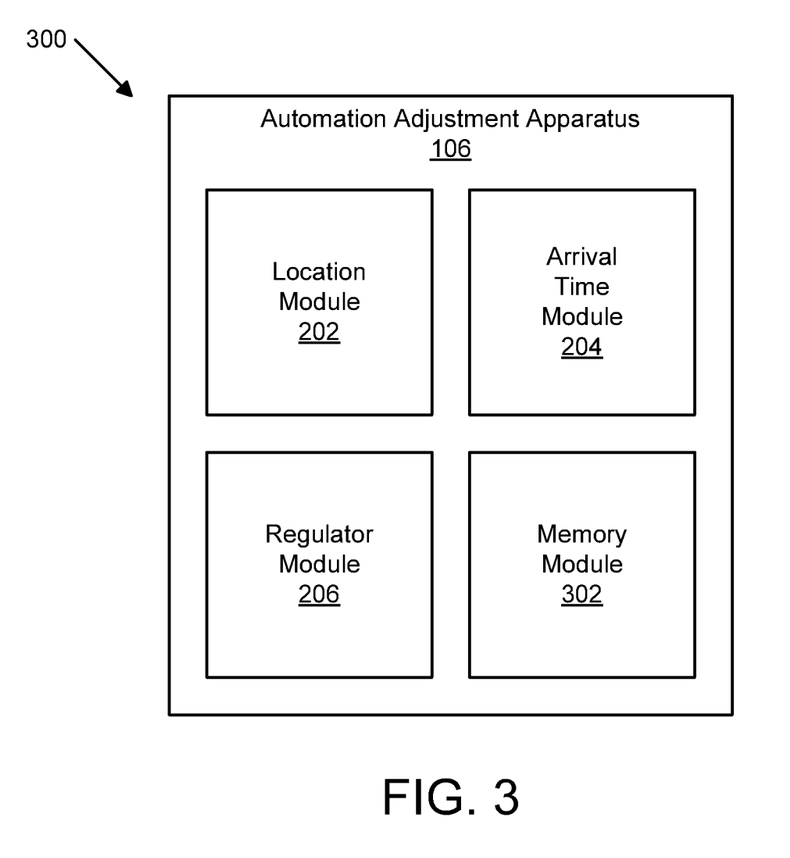
FIG. 3 is a schematic block diagram illustrating another embodiment of an apparatus for adjusting scheduled events in an automation system.

FIG. 3 is a schematic block diagram illustrating another embodiment of an apparatus for adjusting scheduled events in an automation system. The apparatus 300 includes another embodiment of an automation adjustment apparatus 104 with a location module 202, an arrival time module 204, and a regulator module 206, which are substantially similar to those described above in relation to apparatus 200 in FIG. 2. The apparatus 300 also includes a memory module 302, described below.

The memory module 302 records one or more adjustments of the characteristic of a scheduled event in the automation system and an actual time of arrival of the user corresponding to the one or more adjustments of the characteristic the scheduled event in the automation system. In one embodiment, the memory module 302 records the actual arrival time of a user, along with the one or more corresponding adjustments, in the commuting history of the user. The past adjustments and corresponding actual arrival times can be used to calculate an ETA of the user and suggest future adjustments to a particular characteristic of a scheduled event in an automation system.

Figure 4:
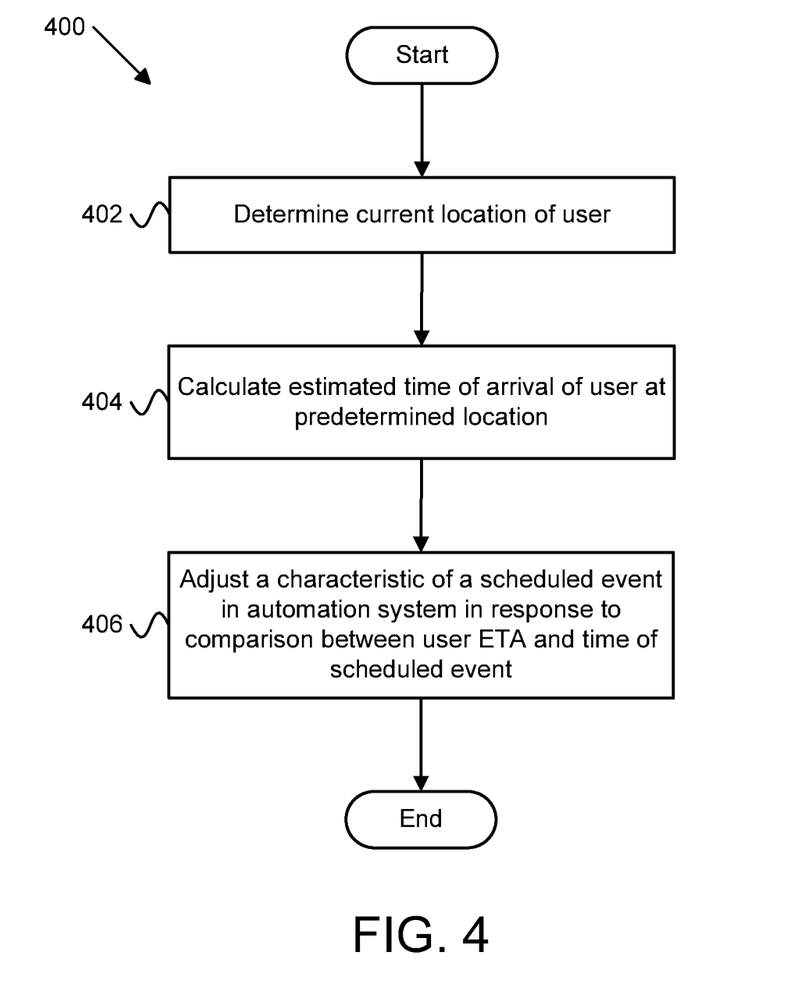
FIG. 4 is a schematic flow chart diagram illustrating one embodiment of a method for adjusting scheduled events in an automation system.

FIG. 4 is a schematic flow chart diagram illustrating one embodiment of a method 400 for adjusting scheduled events in an automation system. The method 400 begins and determines 402 a current location of a user in response to a triggering event.

In one embodiment, determining the current location of a user includes querying a location-based service in communication with a mobile device of the user or a vehicle of the user. The method 400 calculates 404 an estimated time of arrival ("ETA") for the user at a predetermined location. In one embodiment, calculating an ETA for the user at a predetermined location includes factoring in the distance between the current location of the user and the predetermined location, a schedule of the user, a mode of transportation of the user, current traffic conditions, current weather conditions, and/or a commuting history of the user.

The method 400 adjusts 406 a characteristic of a scheduled event in the automation system in response to comparing the ETA of the user to a time of a scheduled event in the automation system and method 400 ends. In one embodiment, adjusting a characteristic of a scheduled event includes receiving permission from the user to adjust the characteristic of the one or more scheduled events. In another embodiment, adjusting a characteristic of a scheduled event includes receiving from the user an adjustment of the characteristic of the one or more scheduled events. In certain embodiments, the method 400 compares the ETA of the user with a time of a scheduled event in an automation system that will occur between the current time and the ETA of the user. In some embodiments, the method 400 compares the ETA of the user with a time of one or more schedule events that will occur between the current time and a set time period after the ETA of the user at the predetermined location.

Figure 5:
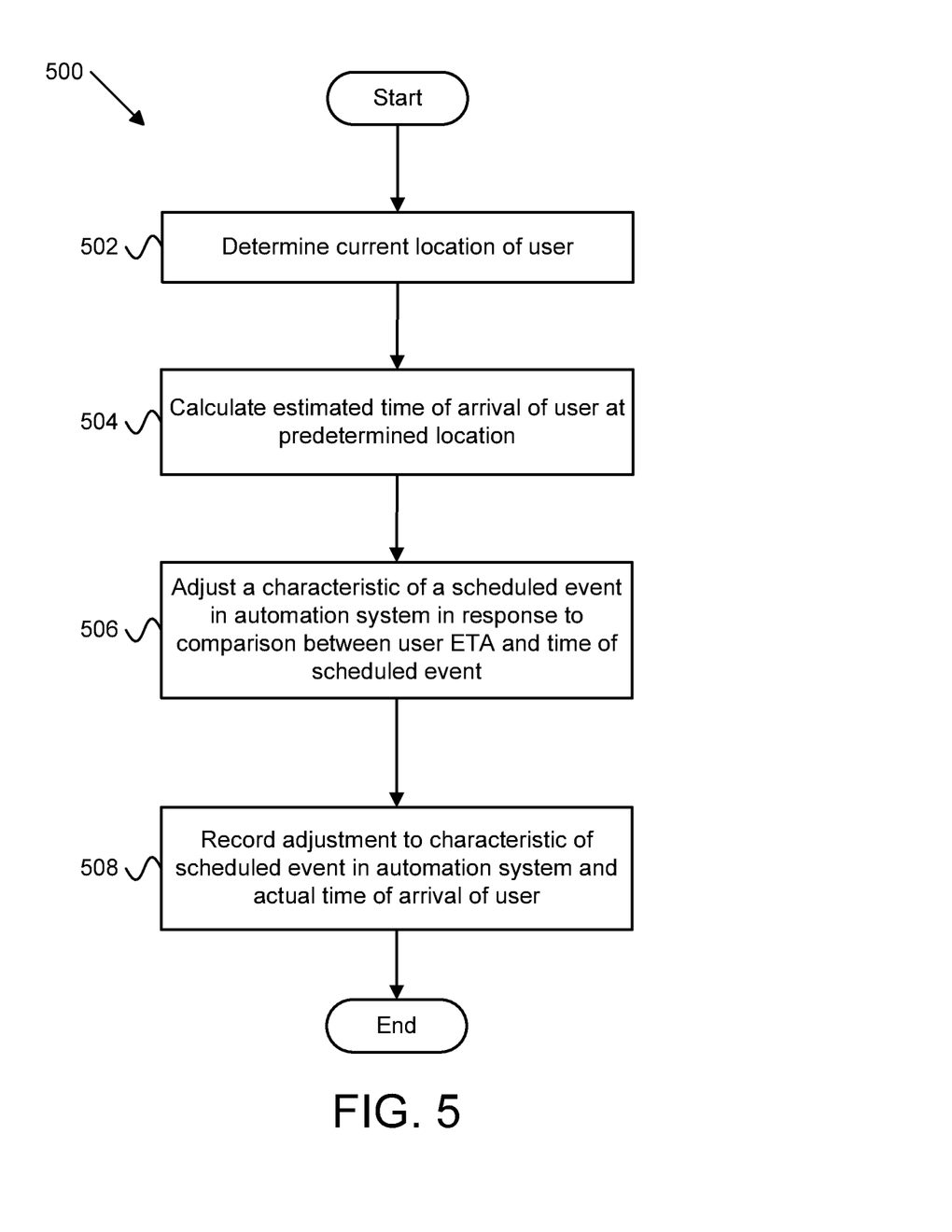
FIG. 5 is a schematic flow chart diagram illustrating another embodiment of a method for adjusting scheduled events in an automation system.

FIG. 5 is a schematic flow chart diagram illustrating another embodiment of a method for adjusting scheduled events in an automation system. The method 500 begins and determines 502 a current location of a user in response to a triggering event. In one embodiment, determining the current location of a user includes querying a location-based service in communication with a mobile device of the user or a vehicle of the user. The method 500 calculates 504 an estimated time of arrival ("ETA") for the user at a predetermined location. In one embodiment, calculating an ETA for the user at a predetermined location includes factoring in the distance between the current location of the user and the predetermined location, a schedule of the user, a mode of transportation of the user, current traffic conditions, current weather conditions, and/or a commuting history of the user.

The method 500 adjusts 506 a characteristic of a scheduled event in the automation system in response to comparing the ETA of the user to a time of a scheduled event in the automation system and method 500 ends. In one embodiment, adjusting a characteristic of a scheduled event includes receiving permission from the user to adjust the characteristic of the one or more scheduled events. In another embodiment, adjusting a characteristic of a scheduled event includes receiving from the user an adjustment of the characteristic of the one or more scheduled events. In certain embodiments, the method 500 compares the ETA of the user with a time of a scheduled event in an automation system that will occur between the current time and the ETA of the user. In some embodiments, the method 500 compares the ETA of the user with a time of one or more schedule events that will occur between the current time and a set time period after the ETA of the user at the predetermined location. The method 500 records one or more adjustments of the characteristic of a scheduled event in the automation system and an actual time of arrival of the user corresponding to the one or more adjustments of the characteristic of the scheduled event in the automation system and method 500 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    a location module that determines a current location of a user in response to a triggering event;
    an arrival time module that calculates an estimated time of arrival of the user at a predetermined location; and
    a regulator module that adjusts a characteristic of a scheduled event in an automation system in response to comparing the estimated time of arrival of the user to a time of the scheduled event in the automation system;
    wherein the location module, the arrival time module, and the regulator module comprise one or more of semiconductor hardware, a memory storing machine readable code, and a processor executing the machine readable code.

2. The apparatus of claim 1, further comprising a memory module that records an adjustment of the characteristic of the scheduled event in the automation system and an actual time of arrival of the user corresponding to the adjustment of the characteristic of the scheduled event in the automation system.

3. The apparatus of claim 1, wherein the triggering event is selected from a group consisting of a command from the user and an arrival of a preset time.

4. The apparatus of claim 1, wherein the location module determining a current location of a user in response to a triggering event comprises querying a location-based service in communication with a device selected from the group consisting of a mobile device of the user and a vehicle of the user.

5. The apparatus of claim 1, wherein the arrival time module calculating an estimated time of arrival of the user at the predetermined location includes a factor selected from the group consisting of the distance between the current location of the user and the predetermined location, a schedule of the user, a mode of transportation of the user, current traffic conditions, current weather conditions, and a commuting history of the user.

6. The apparatus of claim 1, wherein the regulator module adjusting a characteristic of a scheduled event in the automation system in response to comparing the estimated time of arrival of the user to a time of a scheduled event in the automation system comprises one or more of
    receiving permission from the user to adjust the characteristic of a scheduled event in the automation system; and
    receiving from the user an adjustment of the characteristic of a scheduled event in the automation system.

7. The apparatus of claim 1, wherein the characteristic of a scheduled event in the automation system is selected from a group consisting of a time of the scheduled event, a duration of the scheduled event, and an intensity of the scheduled event.

8. A method comprising:
    determining a current location of a user in response to a triggering event;
    calculating an estimated time of arrival of the user at a predetermined location; and
    adjusting a characteristic of a scheduled event in an automation system in response to comparing the estimated time of arrival of the user to a time of the scheduled event in the automation system.

9. The method of claim 8, further comprising recording an adjustment of the characteristic of the scheduled event in the automation system and an actual time of arrival of the user corresponding to the adjustment of the characteristic of the scheduled event in the automation system.

10. The method of claim 8, wherein the triggering event is selected from a group consisting of a command from the user and an arrival of a preset time.

11. The method of claim 8, wherein determining the current location of a user comprises querying a location-based service in communication with a device selected from the group consisting of a mobile device of the user and a vehicle of the user.

12. The method of claim 8, wherein calculating an estimated time of arrival of the user at the predetermined location includes a factor selected from the group consisting of the distance between the current location of the user and the predetermined location, a schedule of the user, a mode of transportation of the user, current traffic conditions, current weather conditions, and a commuting history of the user.

13. The method of claim 8, wherein adjusting a characteristic of a scheduled event in the automation system comprises one or more of
    receiving permission from the user to adjust the characteristic of a scheduled event in the automation system; and
    receiving from the user an adjustment of the characteristic of a scheduled event in the automation system.

14. The method of claim 8, wherein the characteristic of a scheduled event in the automation system is selected from a group consisting of a time of the scheduled event, a duration of the scheduled event, and an intensity of the scheduled event.

15. A program product comprising a computer readable storage medium storing machine readable code executable by a processor to perform:
    determining a current location of a user in response to a triggering event;

calculating an estimated time of arrival of the user at a predetermined location; and adjusting a characteristic of a scheduled event in the automation system in response to comparing the estimated time of arrival of the user to a time of the scheduled event in the automation system.

16. The program product of claim 15, wherein the triggering event is selected from a group consisting of a command from the user and an arrival of a preset time.

17. The program product of claim 15, wherein determining the current location of a user comprises querying a location-based service in communication with a device selected from the group consisting of a mobile device of the user and a vehicle of the user.

18. The program product of claim 15, wherein calculating an estimated time of arrival of the user at the predetermined location includes a factor selected from the group consisting of the distance between the current location of the user and the predetermined location, a schedule of the user, a mode of transportation of the user, current traffic conditions, current weather conditions, and a commuting history of the user.

19. The program product of claim 15, wherein adjusting a characteristic of a scheduled event in the automation system comprises one or more of receiving permission from the user to adjust the characteristic of a scheduled event in the automation system; and receiving from the user an adjustment of the characteristic of a scheduled event in the automation system.

20. The program product of claim 15, wherein the characteristic of a scheduled event in the automation system is selected from a group consisting of a time of the scheduled event, a duration of the scheduled event, and an intensity of the scheduled event.

* * * * *